(12) United States Patent
Lenzing et al.

(10) Patent No.: US 6,619,115 B2
(45) Date of Patent: Sep. 16, 2003

(54) SENSOR SHEATH AND SENSOR DEVICE WITH A SENSOR

(75) Inventors: Thomas Lenzing, Benningen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/759,170

(22) Filed: Jan. 16, 2001

(65) Prior Publication Data
US 2002/0000119 A1 Jan. 3, 2002

(30) Foreign Application Priority Data
Jan. 21, 2000 (DE) .......................... 100 02 438

(51) Int. Cl.⁷ .................................................. G01F 1/68
(52) U.S. Cl. ................................................... 73/204.21
(58) Field of Search ..................... 73/204.21, 204.25, 73/204.15, 204.22, 204.27; 338/28, 25; 374/140, 139

(56) References Cited

U.S. PATENT DOCUMENTS

| | | | |
|---|---|---|---|
| 5,164,675 A | * 11/1992 | Howe et al. ................. 324/663 |
| 5,541,518 A | * 7/1996 | Babbitt et al. .............. 324/454 |
| 5,709,474 A | * 1/1998 | Richardson et al. ........ 374/140 |
| 5,880,365 A | * 3/1999 | Olin et al. ................ 73/204.25 |
| 5,999,081 A | * 12/1999 | Hannigan et al. ............. 338/28 |

* cited by examiner

*Primary Examiner*—Edward Lefkowitz
*Assistant Examiner*—Jewel V. Thompson
(74) *Attorney, Agent, or Firm*—Ronald E. Greigg

(57) ABSTRACT

A sensor sheath for a thermal air flow rate sensor that is intended for disposition in a pipeline through which a fluid flows. In order to prevent the spread of ignition to the remainder of the fluid upon ignition of the fluid in the surroundings of the sensor, a wire grid is provided with meshes which are embodied such that a fluid flows substantially unimpeded through the wire grid, and which has an opening through which the sensor to be sheathed can be introduced into the wire grid.

18 Claims, 1 Drawing Sheet

SENSOR SHEATH AND SENSOR DEVICE WITH A SENSOR

FIELD OF THE INVENTION

The invention relates to a sensor sheath for a thermal air flow rate sensor that is intended for disposition in a pipeline through which a fluid flows, and to a sensor device with a sensor that is surrounded by a sensor sheath of this kind.

BACKGROUND OF THE INVENTION

From German Patent DE 44 07 209 C2, a measuring device is known that serves to measure the mass, or flow rate, of a flowing medium, in particular the aspirated air mass of internal combustion engines. This measuring device is embodied in plate form and has a thermal air flow rate meter, for instance with a hot film resistor as in the HFM5 made by Robert Bosch GmbH. The measuring device is located in a cylindrical aspiration line and is oriented in such a way that the measuring element is oriented parallel to the flow of the aspirated air, so that the flow approaching it is optimal.

This kind of measuring device with a hot film resistor, however, is used not only in motor vehicles for controlling the load-dependent mixture ratio of fuel and air but is also often used in process technology in general. The fluid media employed there are sometimes readily combustible or even explosive substances.

By the operation of a thermal air flow rate meter, the flowing medium can be heated locally in such a way that its temperature may reach the ignition temperature. As a consequence, a flame front created after the ignition of the flowing medium would spread in the form of a fire. Conceivably then, in the worst case, the ignition would prove explosive, causing the destruction of the measuring device, its surroundings, and possibly the entire process technology plant.

OBJECT AND SUMMARY OF THE INVENTION

The sensor sheath has the advantage over the prior art that even if the fluid at the sensor ignites, the flame front cannot penetrate the wire grid, and so the fluid located outside the wire grid cannot ignite. Nevertheless, the unimpeded inflow of fluid to the sensor is assured by the wire grid, and so the flow conditions at the point where the sensor is located are not changed, and the measurement is not adulterated.

The wire grid acts to avert the propagation of ignition in two ways. First, the temperature of the fluid, even if it ignites at the sensor, is lowered outside the wire grid because of the thermal capacity of the wire grid in such a way that the temperature of the fluid outside the wire grid remains below the ignition temperature of the fluid. In other words, a thermal sink exists. Second, the wire grid acts as a Faraday cage, so that the throughput of electromagnetic waves, which a flame front can also be considered to be, is reduced markedly.

It is especially advantageous if the wires of the wire grid are arranged on the one hand parallel to the flow direction of the fluid and on the other orthogonally to this flow direction. The parallelogram-shaped mesh formed by the wires of the wire grid are then embodied as rectangles. It is also especially expedient to embody the individual wires in the form of ovals, so that the wires form a wire grid that in cross section is oval parallel and/or perpendicular to the flow direction of the fluid. This shape is advantageous hydraulically and is simple to produce.

A mesh width of less than 1.2 mm, preferably less than 0.8 mm, and in particular less than 0.6 mm is preferred, since then the shielding actions of the wire grid become fully operative, and nevertheless an unhindered flow of fluid through the wire grid to the sensor is possible.

The opening through which the sensor can be introduced into the sheath of the wire grid is preferably precisely large enough that the sensor device fits through the opening without problems; the spacing between the carrier body of the sensor and the edge of the opening is preferably less than the mesh width of the wire grid. This prevents the sheath from having an open surface region in which the aforementioned shielding actions do not exist. In this way, ignition of the fluid is prevented from spreading from the interior of the wire grid to the exterior in the peripheral region of the opening, which under some circumstances could lead to an explosion.

The invention will be better understood and further objects and advantages thereof will become more apparent from the ensuing detailed description of a preferred embodiment taken in conjunction with the drawing.

Figure 1:
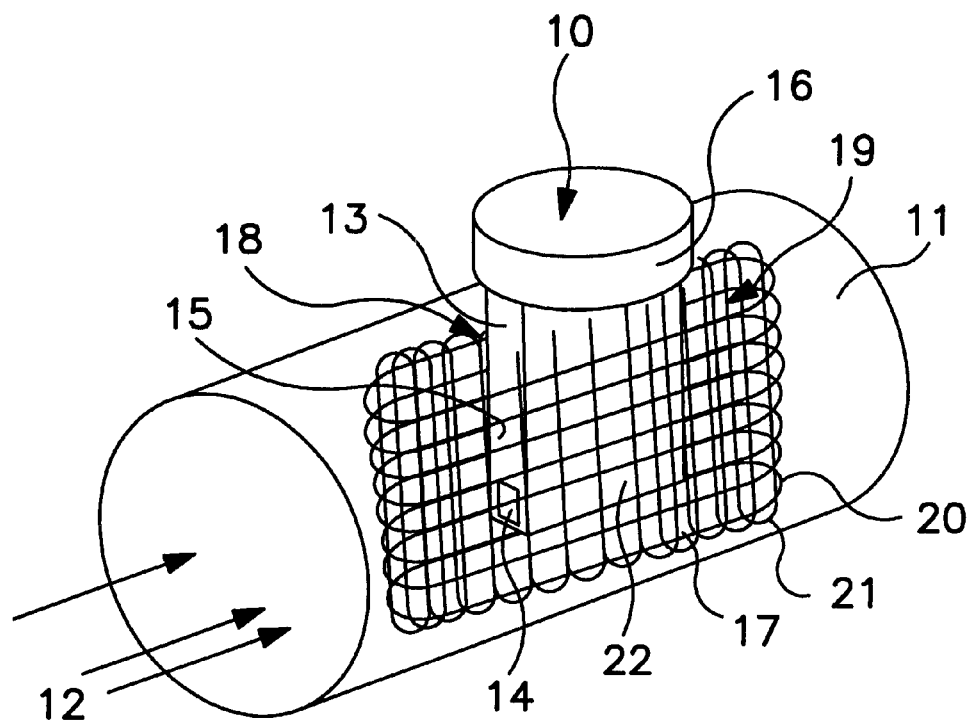
FIG. 1 of the drawing is a schematic view of a sensor sheathed by a wire grid cloth, in particular a thermal air flow rate meter, which is disposed in a pipeline.
Figure 2:
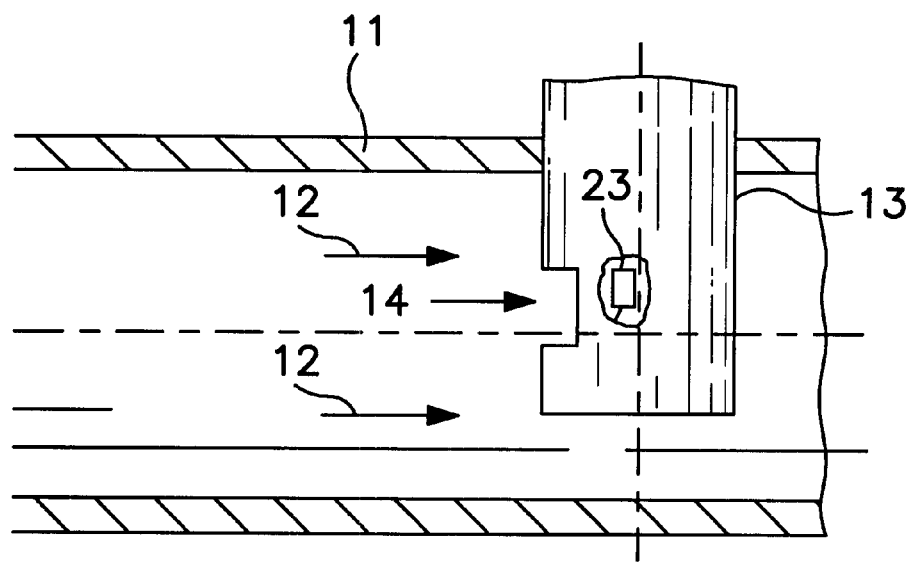
FIG. 2 is a showing of the actual measuring element disposed on the holder.

As the drawing shows, a sensor device 10 is disposed in a pipeline 11, through which a fluid, in particular a readily combustible fluid, can flow in a flow direction 12. The sensor device 10 has a carrier body 13 for a sensor 23 which is disposed in the interior of the carrier body 13 downstream of an inlet 14, as shown in FIG. 2.

The carrier body 13 is embodied for instance in the shape of a parallelepiped; one of its short faces functions as an end face 15, which is disposed the farthest upstream in the flow of fluid. The inlet 14 is mounted on this end face 15, and the fluid to be measured by the sensor enters the carrier body 13 through this inlet. Reliable measurement with the sensor is thus provided for. The sensor here is a thermal air flow rate meter, such as the HFM5 made by Robert Bosch GmbH.

The carrier body 13 is retained in stationary fashion in the pipeline 11 by a holder 16, which can at the same time serve as a closure, so that the pipeline 11 is also tight with regard to the fluid flowing through the pipeline at the point where the carrier body 13 is inserted into it. The embodiment of the holder 16 itself is known and is not essential to the invention, so that this will not be described in further detail here.

A three-dimensionally embodied wire grid 17 surrounds the carrier body 13; on its side toward the holder 16, the wire grid has an opening 18, through which the carrier body 13 can be introduced into the wire grid 17. The wire grid 17 accordingly forms an interior 19 which is partitioned off from the remaining volume of the pipeline 11. The wire grid 17 is embodied in particular as a wire grid cloth. This leads to simple production and good stability of the wire grid 17, especially in the region of the opening 18.

In order to keep the wire grid 17 at a defined, fixed spacing from the sensor, the opening 18 of the wire grid can be embodied for instance as a snap device, which cooperates with corresponding snap means on the carrier body 13. However, other options for connecting the wire grid 17, forming the sensor sheath, to the carrier body 13 are also conceivable. For instance, the opening 18 could be surrounded by a collar extending essentially parallel to the carrier body, which collar engages an annular region between the carrier body 13 and a sheath portion surrounding it. This would at the same time assure that the spacing between the carrier body 13 and the edge of the opening 18 is less than the mesh width of the wire grid 17.

The sensor is disposed at a defined, invariable spacing from the wire grid 17. The wire grid 17 has first wires 20, which are oriented preferably parallel to the flow direction 12 of the fluid, and second wires 21, which are oriented substantially perpendicular to the flow direction 12 of the fluid. Both the first wires 20 and the second wires 21 each have a spacing of less than 1.2 mm, preferably less than 0.8 mm, and in particular less than 0.6 mm, and can for example be disposed with a spacing of 0.5 mm between respective adjacent wires 20, 21.

As a result, meshes or openings 22 of square shape are formed between the wires 20, 21. By means of altered spacings between the wires 20, 21 and different inclinations of the wires 20, 21 relative to the flow direction, parallelogram-shaped and in particular rectangular meshes or openings 22 can also be formed. On their two ends, the first wires 20 each form ovally rounded, closed loops. The same is essentially true for the second wires 21. The second wires 21 in the region of the opening 18 form essentially U-shaped loops, which are ovally rounded only on their ends remote from the opening 18, while on their other ends they are open. The result is an oval shape, both for a cross section of the wire grid 17 parallel to the flow direction 12 and for a cross section perpendicular to it, except for the point where the opening 18 is located.

By embodying the entire assembly comprising the pipeline 11, carrier body 13 with inlet 14 and sensor, and wire grid 17, as described above, it is assured that the fluid flowing through the pipeline 11 can flow virtually unimpeded through the wire grid 17. This circumstance and the disposition of the wire grid 17 at a defined spacing, the consequence of which is an impeded flow of the fluid at the inlet 14 of the carrier body 13, result in the fact that with the sensor, a reliable and precise determination of the mass of the fluid that flows through the pipeline 11 can be accomplished.

The problem that an easily combustible and/or explosive medium or fluid could ignite at a hot thermal sensor, and that the resultant flame front propagates through the fluid and could possibly lead to a fire or even an explosion, is accordingly precluded by the wire grid 17. The wire grid 17 in fact prevents a propagation of ignition of a possibly created flame front from the interior 19 of the wire grid 17 into the remaining volume of the pipeline 11 if the fluid at the sensor should ignite. This is due on the one hand to the fact that the temperature in the remaining volume is lowered by the thermal capacity of the wire grid 17 such that the temperature of the fluid there is below its ignition temperature, even though it is above that temperature in the interior 19. This is equivalent to the effect of a thermal sink. Second, this is due to the fact that the wire grid 17 serves as a Faraday cage, so that the throughput of electromagnetic waves, which is what the flame front can be considered to be, is reduced markedly.

The foregoing relates to a preferred exemplary embodiment of the invention, it being understood that other variants and embodiments thereof are possible within the spirit and scope of the invention, the latter being defined by the appended claims.

We claim:

1. A sensor device (10) including a thermal air flow rate sensor, in which the sensor is mounted on a carrier body (13) which is surrounded by a sensor sheath that is embodied as a wire grid (17) including meshes through which a fluid flows substantially unimpeded.

2. The sensor sheath in accordance with claim 1, in which the wire grid (17) has first wires (20) and second wires (21), which form the openings (22), and the openings (22) thus formed are in a shape of parallelograms.

3. The sensor sheath in accordance with claim 2, in which the first wires (20) are oriented parallel to a flow direction (12).

4. The sensor sheath in accordance with claim 2, in which the second wires (21) are oriented transversely and in particular perpendicularly to a flow direction (12).

5. The sensor sheath in accordance with claim 3, in which the second wires (21) are oriented transversely and in particular perpendicularly to a flow direction (12).

6. The sensor sheath in accordance with claim 1, in which a cross section through the wire grid (17) perpendicular to a flow direction (12) is oval.

7. The sensor sheath in accordance with claim 2, in which a cross section through the wire grid (17) perpendicular to a flow direction (12) is oval.

8. The sensor sheath in accordance with claim 3, in which a cross section through the wire grid (17) perpendicular to a flow direction (12) is oval.

9. The sensor sheath in accordance with claim 1, in which a cross section through the wire grid (17) parallel to the flow direction (12) is oval.

10. The sensor sheath in accordance with claim 2, in which a cross section through the wire grid (17) parallel to the flow direction (12) is oval.

11. The sensor sheath in accordance with claim 3, in which a cross section through the wire grid (17) parallel to the flow direction (12) is oval.

12. The sensor sheath in accordance with claim 4, in which a cross section through the wire grid (17) parallel to the flow direction (12) is oval.

13. The sensor sheath in accordance with claim 2, in which the mesh width between the first wires (20) and/or the mesh width between the second wires (21) amounts to from about 0.6 mm to about 1.2 mm.

14. The sensor sheath in accordance with claim 3, in which the mesh width between the first wires (20) and/or the mesh width between the second wires (21) amounts to from about 0.6 mm to about 1.2 mm.

15. The sensor sheath in accordance with claim 4, in which the mesh width between the first wires (20) and/or the mesh width between the second wires (21) amounts to from about 0.6 mm to about 1.2 mm.

16. The sensor sheath in accordance with claim 2, in which the wire grid (17) is fixed at a defined spacing from the sensor (23) so as not to impede the flow of the fluid at the site of the sensor (23).

17. The sensor sheath in accordance with claim 3, in which the wire grid (17) is fixed at a defined spacing form the sensor (23) so as not to impede the flow of the fluid at the site of the sensor (23).

18. The sensor device (10) in accordance with claim 1, in which the carrier body (13) of the sensor (23) is disposed in a further opening (18) of the sensor sheath causing the carrier body to close the further opening (18) to an extent that the spacing between the carrier body (13) and an edge of the further opening (18) is less than the mesh width of the openings (22) of the wire grid (17).

* * * * *